(12) United States Patent
Chikahisa et al.

(10) Patent No.: US 8,390,774 B2
(45) Date of Patent: Mar. 5, 2013

(54) PROJECTION DISPLAY APPARATUS

(75) Inventors: Shinichiro Chikahisa, Tokyo (JP); Isao Takahashi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 717 days.

(21) Appl. No.: 12/450,210

(22) PCT Filed: Mar. 6, 2008

(86) PCT No.: PCT/JP2008/054031
§ 371 (c)(1),
(2), (4) Date: Sep. 16, 2009

(87) PCT Pub. No.: WO2008/114617
PCT Pub. Date: Sep. 25, 2008

(65) Prior Publication Data
US 2010/0020253 A1    Jan. 28, 2010

(30) Foreign Application Priority Data

Mar. 19, 2007  (JP) ................................. 2007-070804

(51) Int. Cl.
*G02F 1/1335* (2006.01)
(52) U.S. Cl. .............................. 349/119; 349/7; 349/117
(58) Field of Classification Search .................. 349/5–7, 349/117–119
See application file for complete search history.

(56) References Cited

U.S. PATENT DOCUMENTS

| | | |
|---|---|---|
| 6,856,375 B2 | 2/2005 | Yajima et al. |
| 2002/0126228 A1 * | 9/2002 | Yajima et al. ..................... 349/8 |
| 2004/0233362 A1 * | 11/2004 | Kashima ........................ 349/117 |
| 2006/0114385 A1 * | 6/2006 | Ito et al. ......................... 349/119 |
| 2006/0238867 A1 | 10/2006 | Takeda et al. |

FOREIGN PATENT DOCUMENTS

| | | |
|---|---|---|
| JP | 8-50206 | 2/1996 |
| JP | 2002-72162 | 3/2002 |
| JP | 2004-341417 | 12/2004 |
| JP | 2006-072149 | 3/2006 |
| WO | WO 2005/040903 A1 | 5/2005 |

OTHER PUBLICATIONS

Japanese Office Action dated Nov. 5, 2010, with partial English translation.

* cited by examiner

*Primary Examiner* — Nathanael R Briggs
(74) *Attorney, Agent, or Firm* — McGinn IP Law Group, PLLC

(57) ABSTRACT

A projection display apparatus is provided with a liquid crystal panel, and first to third polarizing layers are arranged on an optical path of light. The transmission axis of the first polarizing layer and the transmission axis of the second polarizing layer orthogonally intersect with each other. The transmission axis of the second polarizing layer and the transmission axis of the third polarizing layer are parallel to each other. The first compensation layer compensates a phase difference generated due to pre-tilt angle on the entering side of the liquid crystal panel. The second compensation layer compensates a phase difference generated due to a pre-tilt angle on the outgoing side of the liquid crystal panel. The third compensation layer compensates a phase difference generated due to deviation between the polarization axis of the light entering the third polarizing layer and the transmission axis of the third polarizing layer.

14 Claims, 5 Drawing Sheets

PROJECTION DISPLAY APPARATUS

TECHNICAL FIELD

The present invention relates to a projection display apparatus that projects an image formed by an image forming device.

BACKGROUND ART

A general projection display apparatus includes at least a light source, an illumination optical system, an image-forming device, and a projection optical system. The illumination optical system introduces light emitted from the light source to the image-forming device and illuminates the image-forming device. The image-forming device forms an image (an optical image) by modulating illumination light based on an image signal. The projection optical system projects the image formed by the image-forming device.

When a black image is displayed (i.e., projected) by the project display apparatus that uses a liquid crystal panel as the image-forming device, relatively bright and dark areas appears (uneven brightness appears) on the displayed image. This is because of the following reasons: Typically, polarizing plates are arranged on the incidence side and the exit side of the liquid crystal panel, respectively, so that the transmission axes of the polarizing plates intersect each other at right angles. Light entering the liquid crystal panel is preliminarily converted into linear polarized light. When a white image is displayed, the polarization axis of light entering the liquid crystal panel through the incidence-size polarizing plate rotates 90 degrees. Then, the polarization axis of light exiting the liquid crystal panel is parallel to the transmission axis of the exit-side polarizing plate, so that light exiting the liquid crystal panel passes through the exit-side polarizing plate. The polarization axis of light entering the liquid crystal panel cannot be rotated when the black image is displayed. Then, the polarization axis of light exiting the liquid crystal panel and the transmission axis of the exit-side polarizing plate are at right angle to each other, so that light exiting the liquid crystal panel is interrupted (absorbed) by the exit-side polarizing plate.

However, in practice, part of light exiting the liquid crystal panel is converted into elliptical polarized light due to pre-tilt angles of the incidence side and the exit side on the liquid crystal panel (a liquid crystal layer). More specifically, part of light fluxes exiting the liquid crystal panel is converted into elliptical polarized light. Due to optical anisotropy of the liquid crystal panel, a phase difference occurs in part of the exiting light fluxes. As a result, part of the light fluxes converted into elliptically-polarized light passes through the exit-side polarizing plate, and thus uneven brightness takes place.

When uneven brightness occurs in the black image as described above, the brightness of the entire image rises compared to the case where uneven brightness is not occurring. This, as a result, decreases the difference in brightness between the black image and the white image. In other words, contrast decreases.

In order to solve the foregoing problems, in some types of projection display apparatuses, an optical compensation plate having optical anisotropy opposite to optical anisotropy of a liquate crystal panel is interposed between an incident-side polarizing plate and an exit-side polarizing plate. In detail, the optical anisotropy of the liquid crystal panel is a phase difference generally caused by the pre-tilt angle of a liquid crystal layer. To compensate for the phase difference, the optical compensation plate is interposed. In other words, elliptical polarized light which occurred due to light passing through a liquid crystal panel is converted into liner polarized light. Particulars of the optical compensation plate are disclosed in Japanese laid-open publication No. H08-50206.

In the projection display apparatuses having higher luminance, the amount of light emitted onto the exit-side polarizing plate of the liquid crystal panel increases. When a greater amount of light is emitted onto the polarizing plate, a greater amount of light is absorbed by the polarizing plate. The greater amount of light that is absorbed also increases the amount of heat generation. This, as a result, accelerates deterioration of the exit-side polarizing plate thereby decreasing lifetime.

Accordingly, Japanese laid-open publication No. 2002-72162 discloses an apparatus in which two polarizing plates are arranged on the exit side of a liquid crystal panel in order to decelerate the deterioration of respective polarizing plates by dispersing the amount of light absorption.

SUMMARY OF THE INVENTION

However, characteristics of the polarizing plates have a variation. In addition, when the polarizing plates are installed, some error against design values may be observed. The probability of deviation between the transmission axis of a polarizing plate and the polarization axis of light entering the polarizing plate rises as much as the number of polarizing plates increases. When deviation between the transmission axis of a polarizing plate and the polarization axis of light entering the polarizing plate occurs, part of light exiting the polarizing plate is converted into elliptical polarized light, and the latter polarizing plate cannot completely transmit or intercept light.

The present invention has been devised to overcome the foregoing problems and an object of the invention is to provide a projection display apparatus that displays high-contrast images having even brightness.

To realize this object, the projection display apparatus of the present invention is characterized by means for compensating for a phase difference due to deviation between the transmission axis of a polarizing plate and the polarization axis of light entering the polarizing plate. The compensating means performs compensation by applying a reverse phase that cancels the phase difference. The reverse phase can be previously applied to light entering the polarizing plate or posteriorly applied to light exiting the polarizing plate.

One exemplary embodiment of the projection display apparatus of the invention is a projection display apparatus for projecting modulated light based on an image signal using a liquid crystal panel. The projection display apparatus may include a first polarizing layer provided on an optical path of light entering the liquid crystal panel; a second polarizing layer provided on an optical path of light exiting the liquid crystal panel; a third polarizing layer provided on an optical path of light exiting the liquid crystal panel, between the liquid crystal panel and the second polarizing layer; first through third compensation layers provided between the first and second polarizing layers. A transmission axis of the first polarizing layer intersects a transmission axis of the second polarizing layer at right angles. The transmission axis of the second polarizing layer is parallel to a transmission axis of the third polarizing layer. The first compensation for layer compensates a phase difference caused by an incidence-side pre-tilt angle of the liquid crystal panel. The second compensation layer compensates for a phase difference caused by an exit-side pre-tilt angle of the liquid crystal panel. The third compensation layer compensates for a phase difference due to deviation between a polarization axis of light entering the third polarizing layer and the transmission axis of the third polarizing layer.

The above and other objects, features and advantages of the present invention will be more apparent from the following description taken in conjunction with the accompanying drawings, which illustrate certain exemplary embodiments of the invention.

BEST MODE

Figure 1:
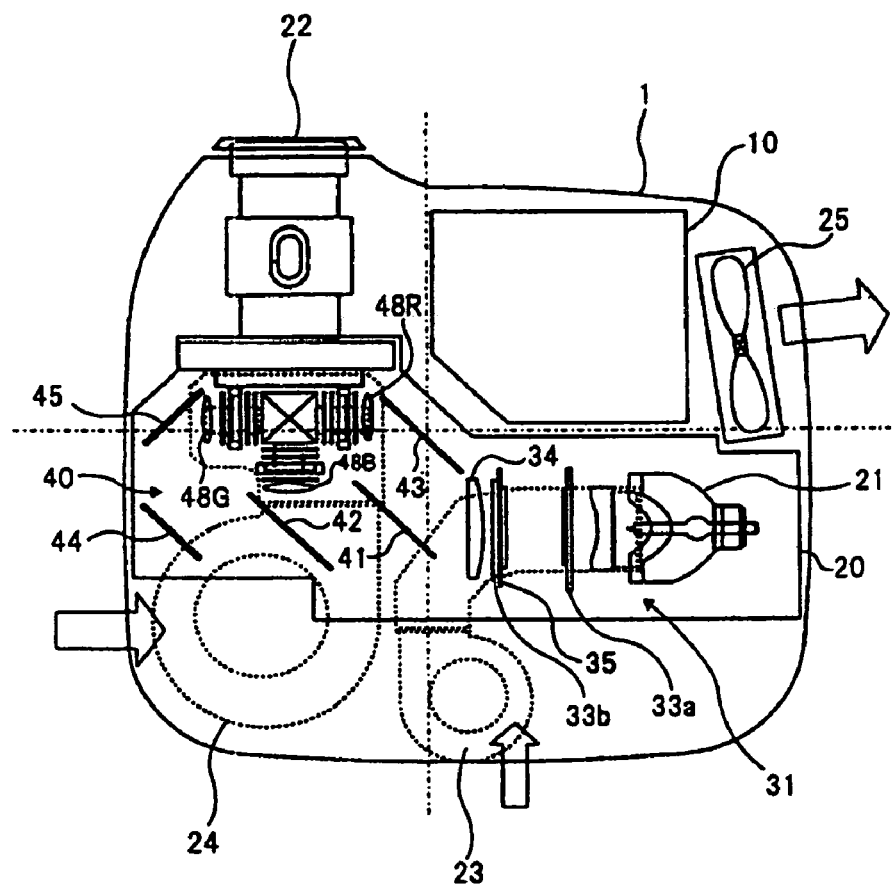
FIG. 1 is a schematic diagram illustrating the internal structure of a projection display apparatus.

The present invention will now be described more fully hereinafter with reference to the accompanying drawings, in which exemplary embodiments of a projective display apparatus are shown. FIG. 1 is a schematic plan view illustrating the internal structure of a projection display apparatus. The projection display apparatus of this embodiment contains components inside outer case 1, which is divided into two, upper and lower parts. Firstly, the arrangement of main components inside the outer case will be described in brief. For the sake of brevity, the internal space of the outer case 1 shown in FIG. 1 is divided in length and breath, forming four parts. Herein, the upper right area of the plane of FIG. 1 is defined as the first area. In the same manner, the upper left, lower right and lower left areas are defined as the second, third and fourth areas, respectively.

In the first area of outer case 1, power supply unit 10 is generally arranged. In the second through fourth areas, optical engine 20 is generally arranged. More specifically, light source lamp 21 is arranged in the fourth area, and projection lens 22 is arranged in the second area. Light generated from light source lamp 21 proceeds counterclockwise generally in the sequence of the fourth area, the third area, and the second area before exiting projection lens 22. In the second and third areas, suction ports (not shown) and suction fans 23 and 24 (such as sirocco fans) for inhaling external air from the suction ports are arranged. In the first area, an exhaust port (not shown) and exhaust fan 25 (such as an axial fan) for expelling the air from inside the outer case are arranged. The external air which is introduced into the outer case from the respective suction ports cools objects, which are supposed to be cooled down, while passing through predetermined passages, and is then expelled from the outer case via the exhaust port. Herein, the main parts arranged on the respective areas are roughly described. Therefore, parts other than the above-described parts can be arranged in the respective areas, and some parts can be arranged over a plurality of the areas.

Figure 2:
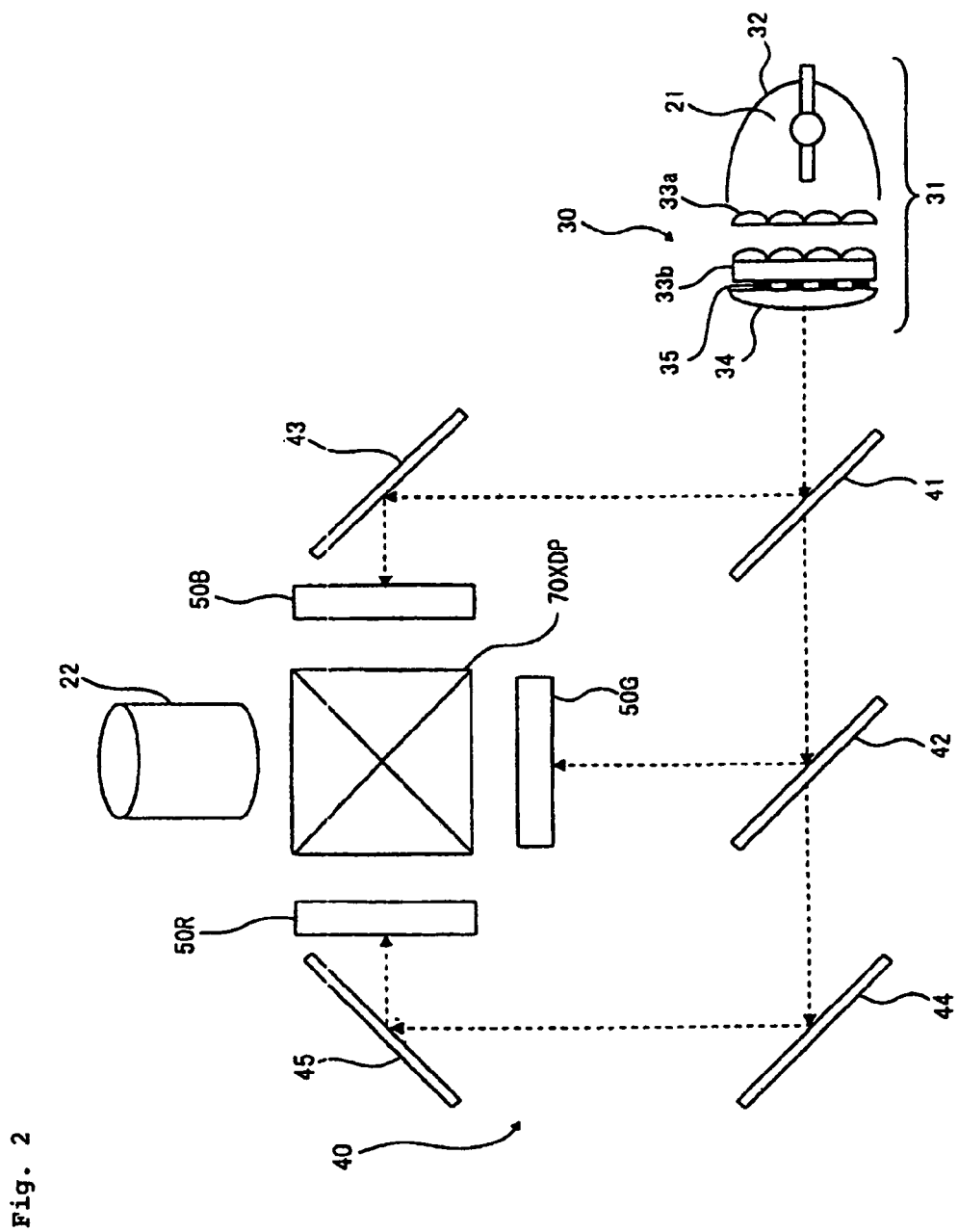
FIG. 2 is a schematic diagram illustrating a configuration of an optical engine shown in FIG. 1.

FIG. 2 is a schematic diagram illustrating optical engine 20. Optical engine 20 includes illumination optical system 31 including light source lamp 21 and integrator optical system 30 that cause luminance distribution of light (illumination light) generated by light source lamp 21 to be uniform. Optical engine 20 also includes color separation optical system 40 that separates light emitted from illumination optical system 31 into respective colors of light such as red, green and blue light. In addition, optical engine 20 includes three liquid crystal panel units 50R, 50G and 50B, which are provided according to the colors of light separated by color separation optical system 40, cross dichroic prism (XDP) 70 synthesizing light modulated by liquid crystal panel units 50R, 50G and 50B, and projection lens 22 projecting light synthesized by XDP 70.

Light source lamp 21 of illumination optical system 31 is a high pressure discharge lamp such as an ultra-high pressure mercury lamp, a xenon lamp, and a metal halide lamp. Reflector 32 is arranged around light source lamp 21. Light generated from light source lamp 21 is reflected by reflector 32, and then enters a pair of lens arrays 33a and 33b which cause luminance distribution of light to be uniform. Specifically, front end lens array 33a forms a plurality of secondary light source images by dividing incident light. The secondary light source images overlap each other on liquid crystal panels by lens array 33b and field lens 34 at the rear end. In addition, polarization conversion device 35 is arranged between lens array 33b and field lens 34. Polarization conversion device 35 aligns polarization planes of light entering the field lens 34. (In this embodiment, light entering field lens 34 is aligned with S polarized light.)

Color separation optical system 40 includes blue-reflecting dichroic mirror 41, green reflecting dichroic mirror 42, and reflecting mirrors 43, 44 and 45. Light exiting integrator optical system 30 firstly enters blue-reflecting dichroic mirror 41. Blue light which is included in light entering blue-reflecting dichroic mirror 41 is reflected by dichroic mirror 41, and then enters liquid crystal panel unit 50B through reflecting mirror 43.

Green light included in light, which has passed through blue-reflecting dichroic mirror 41, enters liquid crystal panel unit 50G through green-reflecting dichroic mirror 42.

Light (red light), which has passed through green-reflecting dichroic mirror 42, enters liquid crystal panel unit 50R through reflecting mirrors 44 and 45.

A relay optical system can be provided on the optical path of each colored light if necessary. In particular, a relay optical system can preferably be provided on the optical path of red light, which has the longest length.

In addition, collecting lenses 48R, 48G and 48B are arranged in the light-entering sides of liquid crystal panel units 50R, 50G and 50B, respectively (see FIG. 1). Each colored light is collimated by respective collecting lens 48R, 48G and 48B before entering matching liquid crystal panel units 50R, 50G and 50B.

Below, a description will be given of the configuration of liquid crystal panel units 50R, 50G and 50B, which are characteristic features of the invention, and surrounding parts. Herein, only liquid crystal panel unit 50G and its surrounding parts will be described since liquid crystal panel units 50R, 50G and 50B and the surrounding parts have a common configuration.

Figure 3:
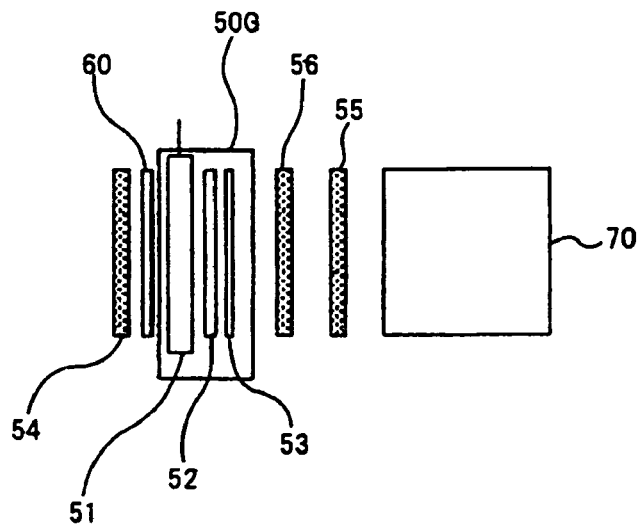
FIG. 3 is a schematic diagram illustrating a configuration of a liquid crystal panel unit shown in FIG. 2 and surrounding parts.

FIG. 3 is a schematic diagram illustrating the configuration of liquid crystal panel unit 50G and the surrounding parts. Liquid crystal panel unit 50G includes liquid crystal panel 51 and two optical compensation plates 52 and 53. Optical compensation plate 52 compensates for a phase difference in emission light based on a pre-tilt angle in the light-incidence side (an incidence-side pre-tilt angle). In addition, optical compensation plate 53 compensates for a phase difference in emission light based on a pre-tilt angle in the light emission side (an exit-side pre-tilt angle). Optical compensation plate 52 corresponds to a first compensation layer of the invention, and optical compensation plate 53 corresponds to a second compensation layer of the invention. Both the phase difference in emission light based on the incidence-side pre-tilt angle and the phase difference in emission light based on the exit-side pre-tilt angle can be compensated for by one optical compensation plate. In other words, both the first and second compensation layers can be implemented with one optical compensation plate.

An incidence-side polarizing plate 54 is arranged on the light-incidence side of liquid crystal panel 51. The incidence-side polarizing plate 54 is a polarizing layer arranged on the path of light entering liquid crystal panel 51, corresponding to the first polarizing layer of the invention.

Two exit-side polarizing plates 55 and 56 are arranged on the light-emission side of liquid crystal panel 51. The transmission axis of two exit-side polarizing plates 55 and 56 and the transmission axis of incidence-side polarizing plate 54 intersect each other at right angles. Exit-side polarizing plate 55 is a polarizing layer having the transmission axis which intersects the transmission axis of incidence-side polarizing plate 54 at right angles, and corresponds to the second polarizing layer of the invention. In addition, the transmission axis of exit-side polarizing plate 56 that crosses crossing the transmission axis of incidence-side polarizing plate 54 at right angles is parallel to the transmission axis of exit-side polarizing plate 55. In other words, exit-side polarizing plate 56 is the polarizing layer that is provided on the path of light existing liquid crystal panel 51 and has a transmission axis parallel to the transmission axis of the second polarizing layer. Furthermore, exit-side polarizing plate 56 is a polarizing layer provided between liquid crystal panel 51 and exit-side polarizing plate 55 acting as the second polarizing layer. Accordingly, exit-side polarizing plate 56 corresponds to the third polarizing layer of the invention. The two exit-side polarizing plates are prepared in order to increase the lifetime of polarizing plates 55 and 56 by distributing the amount of absorbing light.

In this embodiment, light entering liquid crystal panel 51 is previously aligned with S polarized light, and incidence-side polarizing plate 54 allows only S-polarized light to pass through. Accordingly, only light whose polarization plane is rotated 90 degrees by liquid crystal panel 51 (P-polarized light) can pass through exit-side polarizing plates 55 and 56.

Optical compensation plate 60 is arranged as a third compensation layer between incidence-side polarizing plate 54 and liquid crystal panel 51. Optical compensation plate 60 compensates for a phase difference due to deviation between the transmission axis of exit-side polarizing plate 56 and transmission axis of light entering exit-side polarizing plate 56. More specifically, optical compensation plate 60 previously imparts a phase opposite to the phase difference due to the above deviation to light entering thereto. This, as a result, cancels the phase difference due to deviation, and all light fluxes exiting exit-side polarizing plate 56 become linearly polarized light. In addition, optical compensation plates 52 and 53 as described above are common to optical compensation plate 60 since they also compensate for a phase difference by applying a reverse phase to transmitting light.

Table 1 below describes test results of the projection display apparatus of this example and a projection display apparatus of a comparative example. The projection display apparatus of the comparative example has the same configuration as the projection display apparatus of this example except that optical compensation plate 54 shown in FIG. 3 is not provided.

In this comparative evaluation, the same black images (also referred to as "all black") and white images (also referred to as "all white") were projected onto the same screen by respective projection display apparatuses, and contrast and plane black luminance were compared.

Herein, the term "contrast" indicates a ratio of plane luminance between when an all white is projected and when an all black is projected. The plane luminance was measured based on ANSI standards. Specifically, as shown in FIG. 10, projection images were equally divided into nine (9) areas (a) through (i), and the average of luminance of each area was obtained.

Figure 10:
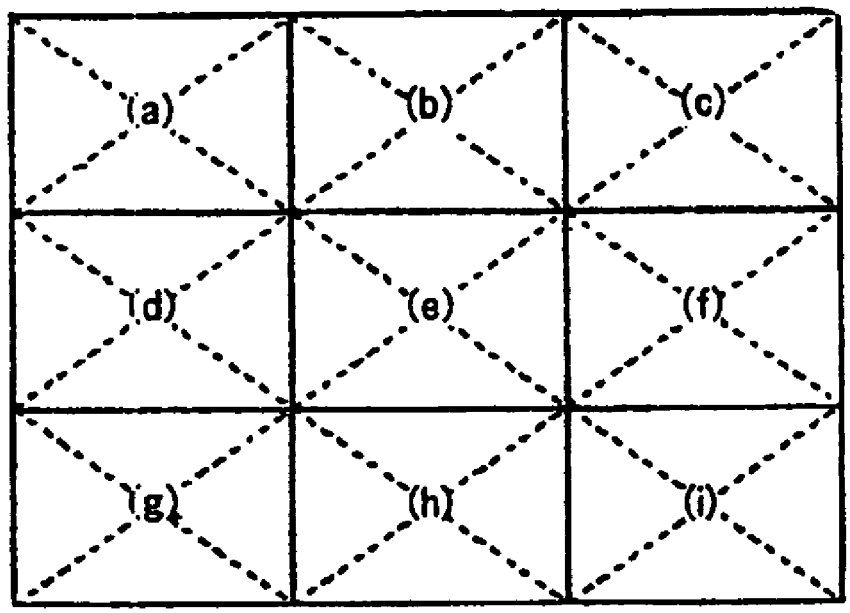
FIG. 10 is a schematic view illustrating a comparative estimation method.

The term plane black luminance is a value obtained by dividing the difference between, a sum of the luminance of area (a) and the luminance of area (i), and, a sum of the luminance of area (c) and the luminance of area (g) with the luminance of area (e) shown in FIG. 10.

The comparative test was performed as follows: Firs, the contrast and plane black luminance were obtained eight (8) times from the projection display apparatus of this example and the average was calculated. Then, the contrast and plane black luminance were obtained 8 times from the projection display apparatus of the comparative example and the average was calculated. Next, the two averages were compared. Numeric values listed in Table 1 below are calculated averages.

TABLE 1

|  | Contrast | Plane black luminance ratio |
|---|---|---|
| Projection display apparatus of present example | 656 | 0.04 |
| Projection display apparatus of comparative example | 568 | 0.22 |

In the comparative test, it has been confirmed that both contrast and plane black luminance were improved in the projection display apparatus of the invention. Specifically, the projection display apparatus of the invention showed contrast improvement of 15% but reduction in plane black luminance to about ⅕ compared to the projection display apparatus of the comparative example.

The configuration of the liquid crystal panel unit, the arrangement of the polarizing plate and optical compensation plate, and the like are not limited to those shown in FIG. 3. FIGS. 4 through 9 illustrate other examples of the configuration of the liquid crystal panel unit and the arrangement of the polarizing plate and optical compensation plate. Herein, a description will also be given with respect to liquid crystal panel unit 50G.

Figure 4:
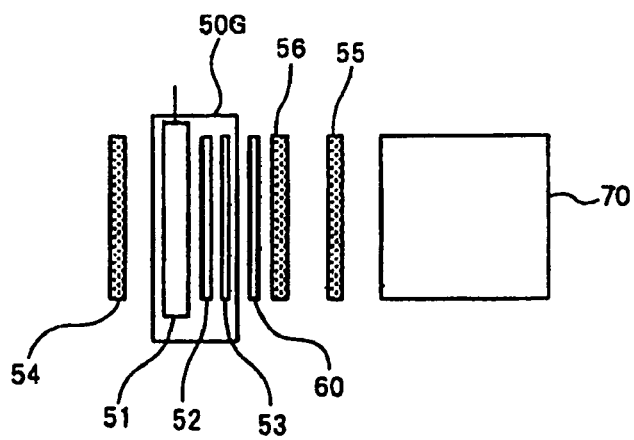
FIG. 4 is a schematic diagram illustrating the configuration of the liquid crystal panel unit and the surrounding parts.

As shown in FIG. 4, optical compensation plate 60 can be arranged between liquid crystal panel unit 50G and exit-side polarizing plate 56. More specifically, optical compensation plate 60 can be arranged between optical compensation plate 53 of liquid crystal panel unit 50G and exit-side polarizing plate 56. Liquid crystal panel unit 50G shown in FIG. 4 has the same configuration as liquid crystal panel unit 50G shown in FIG. 3.

Figure 5:
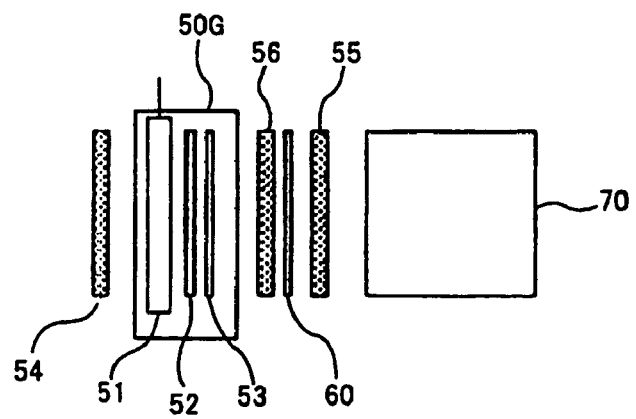
FIG. 5 is a schematic view illustrating another configuration of a liquid crystal panel unit and surrounding parts.

As shown in FIG. 5, optical compensation plate 60 can be arranged between two exit-side polarizing plates 55 and 56. Liquid crystal panel unit 50G shown in FIG. 5 has the same configuration as liquid crystal panel unit 50G shown in FIG. 3.

Figure 6:
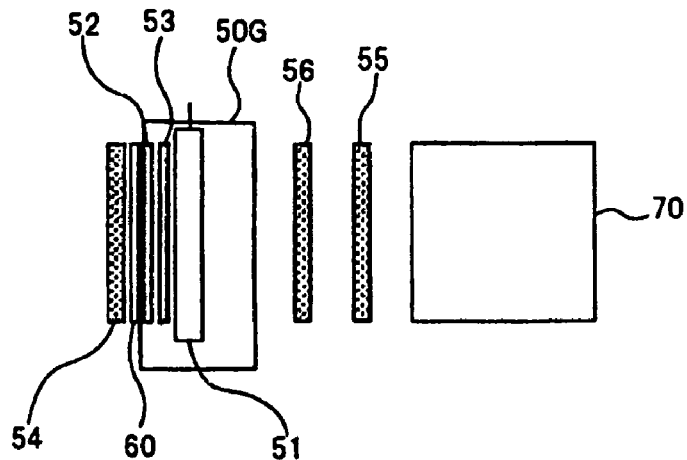
FIG. 6 is a schematic view illustrating a further configuration of a liquid crystal panel unit and surrounding parts.

In liquid crystal panel unit 50G shown in FIG. 6, optical compensation plates 52 and 53 are arranged on the light-incidence side of liquid crystal panel 51. In addition, optical compensation plate 60 is arranged on the light-incidence side of liquid crystal panel unit 50G. Specifically, optical compensation plate 60 is arranged between incidence-side polarizing plate 54 and optical compensation plate 52. Accordingly, three optical compensation plates 52, 53 and 60 are arranged between incidence-side polarizing plate 54 and liquid crystal panel 51.

Figure 7:
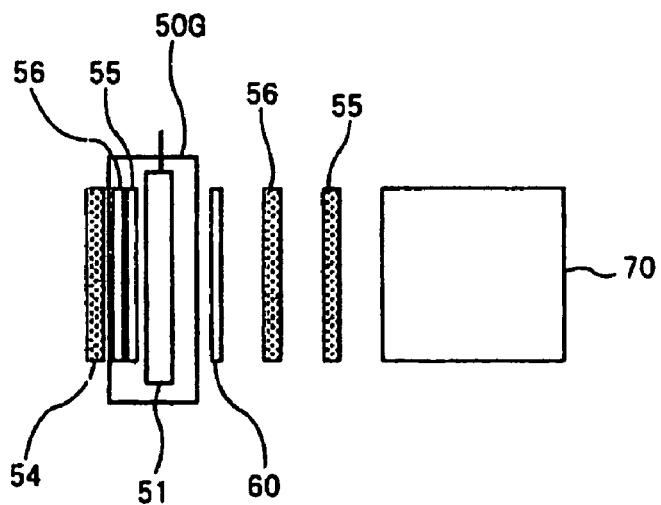
FIG. 7 is a schematic view illustrating still another configuration of a liquid crystal panel unit and surrounding parts.

As shown in FIG. 7, optical compensation plate 60 can be arranged on the light-exit side of liquid crystal panel unit 50G shown in FIG. 6. Specifically, optical compensation plate 60 can be arranged between liquid crystal panel 51 of liquid crystal panel unit 50G and exit-side polarizing plate 56.

Figure 8:
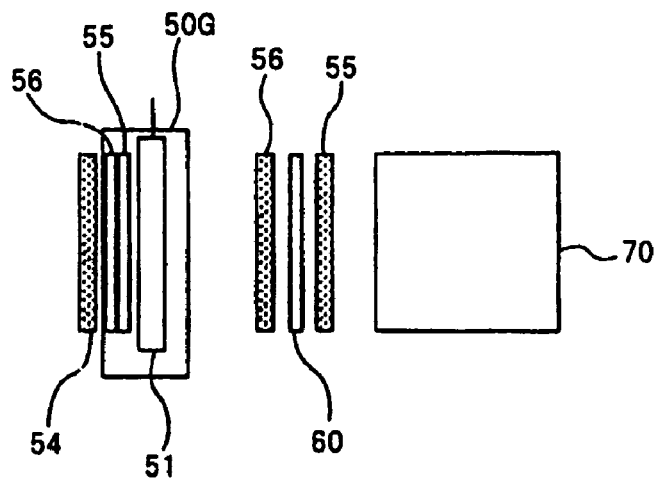
FIG. 8 is a schematic view illustrating another configuration of a liquid crystal panel unit and surrounding parts.

In addition, as shown in FIG. 8, optical compensation plate 60 can be arranged between two exit-side polarizing plates 55 and 56.

Figure 9:
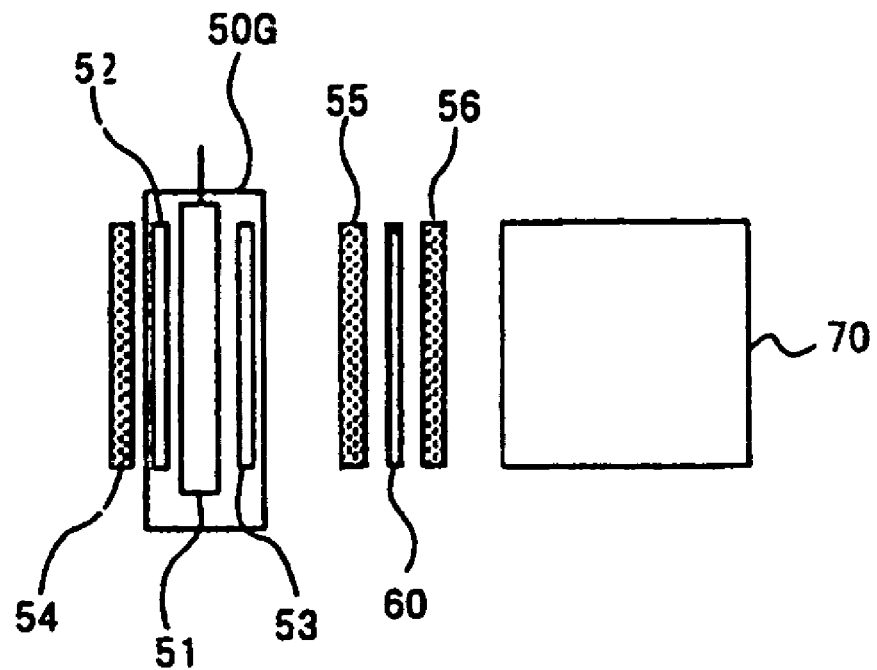
FIG. 9 is a schematic view illustrating yet another configuration of a liquid crystal panel unit and surrounding parts.

In liquid crystal panel unit 50G shown in FIG. 9, optical compensation plate 52 is arranged on the light-incidence side of liquid crystal panel 51, and optical compensation plate 53 is arranged on the light-exit side. Specifically, liquid crystal panel 51 is sandwiched by optical compensation plate 52 and optical compensation plate 53. Optical compensation plate 60 is arranged between two exit-side polarizing plates 55 and 56 arranged on the light-exit side of liquid crystal panel unit 50G.

Any of the configurations shown in FIGS. 4 through 9 can obtain substantially the same functions and effects as the configuration shown in FIG. 3.

Herein, the certain exemplary embodiments of the invention have been described on the premise that they have a common configuration in liquid crystal panel units 50R, 50G and 50B and surrounding parts. However, configurations of respective RGB light paths are not necessarily common. In the case where these configurations are applied to only one light path, it is most effective in view of improvement in contrast to apply it to the G light path.

The present application claims priority from Japanese Patent Application Number 2007-70804, filed Mar. 19, 2007, the disclosure of which is hereby incorporated by reference herein in its entirety.

The invention claimed is:

1. A projection display apparatus for projecting light that is modulated based on an image signal by a liquid crystal panel, the projection display apparatus comprising:
   a first polarizing layer provided on an optical path of light entering the liquid crystal panel;
   a second polarizing layer provided on an optical path of light exiting the liquid crystal panel;
   a third polarizing layer provided on an optical path of light exiting the liquid crystal panel, between the liquid crystal panel and the second polarizing layer; and
   first through third compensation layers provided between the first and second polarizing layers,
   wherein a transmission axis of the first polarizing layer intersects a transmission axis of the second polarizing layer at right angles,
   wherein the transmission axis of the second polarizing layer is parallel to a transmission axis of the third polarizing layer,
   wherein the first compensation layer compensates for a phase difference caused by an incidence-side pre-tilt angle of the liquid crystal panel,
   wherein the second compensation layer compensates for a phase difference caused by an exit-side pre-tilt angle of the liquid crystal panel,
   wherein the third compensation layer compensates for a phase difference due to a deviation between a polarization axis of light entering the third polarizing layer and the transmission axis of the third polarizing layer, and
   wherein the third compensation layer is located in an exit side of the light exiting the liquid crystal panel.

2. A projection display apparatus for projecting light that is modulated based on an image signal by a liquid crystal panel, the projection display apparatus comprising:
   a first polarizing layer provided on an optical path of light entering the liquid crystal panel;
   a second polarizing layer provided on an optical path of light exiting the liquid crystal panel;
   a third polarizing layer provided on an optical path of light exiting the liquid crystal panel, between the liquid crystal panel and the second polarizing layer; and
   first through third compensation layers provided between the first and second polarizing layers,
   wherein a transmission axis of the first polarizing layer intersects a transmission axis of the second polarizing layer at right angles,
   wherein the transmission axis of the second polarizing layer is parallel to a transmission axis of the third polarizing layer,
   wherein the first compensation layer compensates for a phase difference caused by an incidence-side pre-tilt angle of the liquid crystal panel, wherein the second compensation layer compensates for a phase difference caused by an exit-side pre-tilt angle of the liquid crystal panel,
   wherein the third compensation layer compensates for a phase difference due to a deviation between a polarization axis of light entering the third polarizing layer and the transmission axis of the third polarizing layer,
   wherein the third compensation layer is provided between the liquid crystal panel and the third polarizing layer, and
   wherein the third compensation layer is located in an exit side of the light exiting the liquid crystal panel.

3. A projection display apparatus for projecting light that is modulated based on an image signal by a liquid crystal panel, the projection display apparatus comprising:
   a first polarizing layer provided on an optical path of light entering the liquid crystal panel;
   a second polarizing layer provided on an optical path of light exiting the liquid crystal panel;
   a third polarizing layer provided on an optical path of light exiting the liquid crystal panel, between the liquid crystal panel and the second polarizing layer; and
   first through third compensation layers provided between the first and second polarizing layers,
   wherein a transmission axis of the first polarizing layer intersects a transmission axis of the second polarizing layer at right angles,
   wherein the transmission axis of the second polarizing layer is parallel to a transmission axis of the third polarizing layer, wherein the first compensation layer compensates for a phase difference caused by an incidence-side pre-tilt angle of the liquid crystal panel, wherein the second compensation layer compensates for a phase difference caused by an exit-side pre-tilt angle of the liquid crystal panel, wherein the third compensation layer compensates for a phase difference due to a deviation between a polarization axis of light entering the third polarizing layer and the transmission axis of the third polarizing layer, wherein the third compensation layer is provided between the third polarizing layer and the second polarizing layer, and wherein the third compensation layer is located in an exit side of the light exiting the liquid crystal panel.

4. The projection display apparatus of claim 1, wherein the third polarizing layer and/or the third compensation layer is rotatable about an axis of the light entering the third polarizing layer and/or the third compensation layer.

5. The projection display apparatus of claim 2, wherein the third polarizing layer and/or the third compensation layer is rotatable about an axis of the light entering the third polarizing layer and/or the third compensation layer.

6. The projection display apparatus of claim 3, wherein the third polarizing layer and/or the third compensation layer is rotatable about an axis of the light entering the third polarizing layer and/or the third compensation layer.

7. The projection display apparatus of claim 1, wherein the first through third polarizing layers include an optical element allowing only linearly polarized light to pass through, and
wherein the third polarizing layer includes an optical element applying a predetermined phase to incidence light, the predetermined light being opposite to the phase difference due to the deviation between the polarization axis of the light entering the third polarizing layer and the transmission axis of the third polarizing layer.

8. The projection display apparatus of claim 2, wherein the first through third polarizing layers include an optical element allowing only linearly polarized light to pass through, and
wherein the third polarizing layer includes an optical element applying a predetermined phase to incidence light, the predetermined light being opposite to the phase difference due to the deviation between the polarization axis of the light entering the third polarizing layer and the transmission axis of the third polarizing layer.

9. The projection display apparatus of claim 3, wherein the first through third polarizing layers include an optical element allowing only linearly polarized light to pass through, and
wherein the third polarizing layer includes an optical element applying a predetermined phase to incidence light, the predetermined light being opposite to the phase difference due to the deviation between the polarization axis of the light entering the third polarizing layer and the transmission axis of the third polarizing layer.

10. A projection display apparatus for projecting light that is modulated based on an image signal by a liquid crystal panel, the projection display apparatus comprising:
a first polarizing layer provided on an optical path of light entering the liquid crystal panel;
a second polarizing layer provided on an optical path of light exiting the liquid crystal panel;
a third polarizing layer provided on an optical path of light exiting the liquid crystal panel, between the liquid crystal panel and the second polarizing layer; and
first through third compensation layers provided between the first and second polarizing layers, wherein a transmission axis of the first polarizing layer intersects a transmission axis of the second polarizing layer at right angles, wherein the transmission axis of the second polarizing layer is parallel to a transmission axis of the third polarizing layer, wherein the first compensation layer compensates for a phase difference caused by an incidence-side pre-tilt angle of the liquid crystal panel, wherein the second compensation layer compensates for a phase difference caused by an exit-side pre-tilt angle of the liquid crystal panel, wherein the third compensation layer compensates for a phase difference due to deviation between a polarization axis of light entering the third polarizing layer and the transmission axis of the third polarizing layer, wherein the first through third polarizing layers include an optical element allowing only linearly polarized light to pass through, wherein the third polarizing layer includes an optical element applying a predetermined phase to incidence light, the predetermined light being opposite to the phase difference due to a deviation between a polarization axis of light entering the third polarizing layer and the transmission axis of the third polarizing layer, wherein each of the first through third polarizing layer includes a polarizing plate, and the third compensating layer comprises an optical compensation plate, and wherein the third compensation layer is located in an exit side of the light exiting the liquid crystal panel.

11. The projection display apparatus of claim 1, further comprising:
a liquid crystal panel unit located between the first polarizing layer and the third polarizing layer,
wherein the first compensation layer, the second compensation layer, and the liquid crystal panel are located inside the liquid crystal panel unit.

12. The projection display apparatus of claim 11, wherein the third compensation layer is located outside the liquid crystal panel unit.

13. The projection display apparatus of claim 1, wherein a surface of the third compensation layer faces a surface of one of the first polarizing layer, the second polarizing layer, and the third polarizing layer.

14. The projection display apparatus of claim 1, wherein, with respect to the first compensation layer and the second compensation layer, the third compensation layer is located adjacent to one of the first polarizing layer, the second polarizing layer, and the third polarizing layer.

* * * * *